(12) United States Patent
Tee et al.

(10) Patent No.: US 11,514,950 B2
(45) Date of Patent: Nov. 29, 2022

(54) WELDED BASE AND COVER FOR HARD DISK DRIVES

(71) Applicant: Seagate Technology LLC, Fremont, CA (US)

(72) Inventors: Wei Leng Tee, Singapore (SG); Chee Kwong Cheng, Singapore (SG); Samuel E. Severson, Longmont, CO (US); S Selvaruban, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 11 days.

(21) Appl. No.: 17/193,215

(22) Filed: Mar. 5, 2021

(65) Prior Publication Data

US 2022/0284931 A1 Sep. 8, 2022

(51) Int. Cl.
| G11B 33/02 | (2006.01) |
| G11B 25/04 | (2006.01) |
| G11B 5/82  | (2006.01) |
| G11B 33/14 | (2006.01) |
| B23K 20/12 | (2006.01) |

(52) U.S. Cl.
CPC .............. *G11B 33/022* (2013.01); *G11B 5/82* (2013.01); *G11B 25/043* (2013.01); *G11B 33/1466* (2013.01); *B23K 20/122* (2013.01)

(58) Field of Classification Search
None
See application file for complete search history.

(56) References Cited

U.S. PATENT DOCUMENTS

| 5,194,696 | A | * | 3/1993 | Read | G11B 33/1466 |
| | | | | | 277/606 |
| 5,422,766 | A | * | 6/1995 | Hack | G11B 33/1466 |
| | | | | | 360/99.18 |
| 5,696,648 | A | | 12/1997 | Jeong et al. | |
| 6,061,204 | A | | 5/2000 | Tong | |
| 6,392,838 | B1 | | 5/2002 | Hearn et al. | |
| 6,556,372 | B2 | | 4/2003 | Hearn et al. | |
| 6,561,347 | B1 | * | 5/2003 | Lax | G11B 33/0427 |
| | | | | | 206/472 |
| 7,508,682 | B2 | * | 3/2009 | Badarinarayan | H05K 5/066 |
| | | | | | 361/752 |
| 8,031,431 | B1 | | 10/2011 | Berding et al. | |
| 8,279,552 | B2 | | 10/2012 | Stipe | |
| 8,335,050 | B2 | | 12/2012 | Kavosh et al. | |
| 8,451,559 | B1 | * | 5/2013 | Berding | G11B 33/1466 |
| | | | | | 360/99.21 |
| 9,190,116 | B2 | | 11/2015 | Freeman | |
| 9,754,631 | B2 | | 9/2017 | Severson et al. | |
| 9,786,330 | B1 | * | 10/2017 | Usami | G11B 33/1446 |

(Continued)

FOREIGN PATENT DOCUMENTS

JP H08161881 A * 6/1996 ......... G11B 33/1466

*Primary Examiner* — William J Klimowicz
(74) *Attorney, Agent, or Firm* — Faegre Drinker Biddle & Reath (57) ABSTRACT

A hard disk drive includes a base deck with a floor portion and a side wall portion. The floor portion extends between an upper surface and a bottom surface, and the side wall portion extends from the floor portion. A top cover is coupled to the base deck and includes a ceiling portion and a wall portion. The hard disk drive includes a weld that directly couples the wall portion of the top cover to the floor portion of the base deck.

20 Claims, 8 Drawing Sheets

(56) References Cited

U.S. PATENT DOCUMENTS

| | | | |
|---|---|---|---|
| 10,399,177 B1* | 9/2019 | Coffey | B23K 20/1255 |
| 10,442,030 B2 | 10/2019 | Severson et al. | |
| 10,566,032 B2 | 2/2020 | Coffey et al. | |
| 10,569,356 B1 | 2/2020 | Coffey et al. | |
| 10,596,658 B1 | 3/2020 | Coffey et al. | |
| 10,699,753 B2 | 6/2020 | Lee et al. | |
| 10,796,727 B1* | 10/2020 | Coffey | G11B 33/022 |
| 10,803,908 B1* | 10/2020 | Tamura | G11B 33/027 |
| 10,870,167 B2 | 12/2020 | Coffey et al. | |
| 11,020,816 B1* | 6/2021 | Coffey | B23K 20/127 |
| 11,031,048 B1* | 6/2021 | Ma | G11B 33/027 |
| 2007/0064403 A1* | 3/2007 | Badarinarayan | B23K 20/1265 361/796 |
| 2008/0011810 A1* | 1/2008 | Burford | B23K 20/1255 228/2.1 |
| 2008/0165448 A1* | 7/2008 | Ichikawa | G11B 25/043 29/603.03 |
| 2012/0275106 A1 | 11/2012 | McGuire, Jr. | |
| 2012/0275287 A1 | 11/2012 | McGuire, Jr. et al. | |
| 2017/0062019 A1* | 3/2017 | Severson | G11B 33/14 |
| 2017/0308114 A1* | 10/2017 | Fitzgerald | G06F 1/16 |
| 2019/0076956 A1* | 3/2019 | Coffey | G06F 1/1656 |
| 2019/0076957 A1* | 3/2019 | Severson | B23K 20/1225 |
| 2020/0038990 A1* | 2/2020 | Coffey | H05K 5/04 |
| 2021/0074324 A1* | 3/2021 | Kato | G11B 33/148 |
| 2022/0084558 A1* | 3/2022 | Akatsuka | G11B 33/027 |
| 2022/0122634 A1* | 4/2022 | Kato | G11B 25/043 |

* cited by examiner

WELDED BASE AND COVER FOR HARD DISK DRIVES

SUMMARY

In certain embodiments, a hard disk drive includes a base deck with a floor portion and a side wall portion. The floor portion extends between an upper surface and a bottom surface, and the side wall portion extends from the floor portion. The hard disk drive includes a process cover and a top cover. The process cover is coupled to the base deck. The top cover is coupled to the base deck and includes a ceiling portion and a wall portion. The wall portion extends from the ceiling portion and terminates between the upper surface and the bottom surface of the floor portion of the base deck.

In certain embodiments, a hard disk drive includes a base deck with a floor portion and a side wall portion. The floor portion extends between an upper surface and a bottom surface, and the side wall portion extends from the floor portion. A top cover is coupled to the base deck and includes a ceiling portion and a wall portion. The hard disk drive includes a weld that directly couples the wall portion of the top cover to the floor portion of the base deck.

In certain embodiments, a method for assembling a base deck to a top cover is disclosed. The method includes coupling a process cover to a base deck, coupling a top cover to the base deck such that a distal end of a wall portion of the top cover terminates adjacent to a floor portion of the base deck, and welding the top cover to the floor portion of the base deck.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Hard disk drives can be filled with air and a lower density gas, such as helium, and sealed to control and maintain the internal environment of the hard disk drives. For example, hard disk drives can include a base deck and a cover that are coupled together to form a sealed, enclosed internal cavity. One approach for coupling base decks and covers together is to weld the parts to each other. However, some portions of the base decks and/or covers may be relatively thin and therefore are more likely to deform during welding such that the base decks and/or covers do not meet dimensional requirements. Certain embodiments of the present disclosure are directed to reducing the risk of deformating hard disk drive components during welding.

Figure 1:
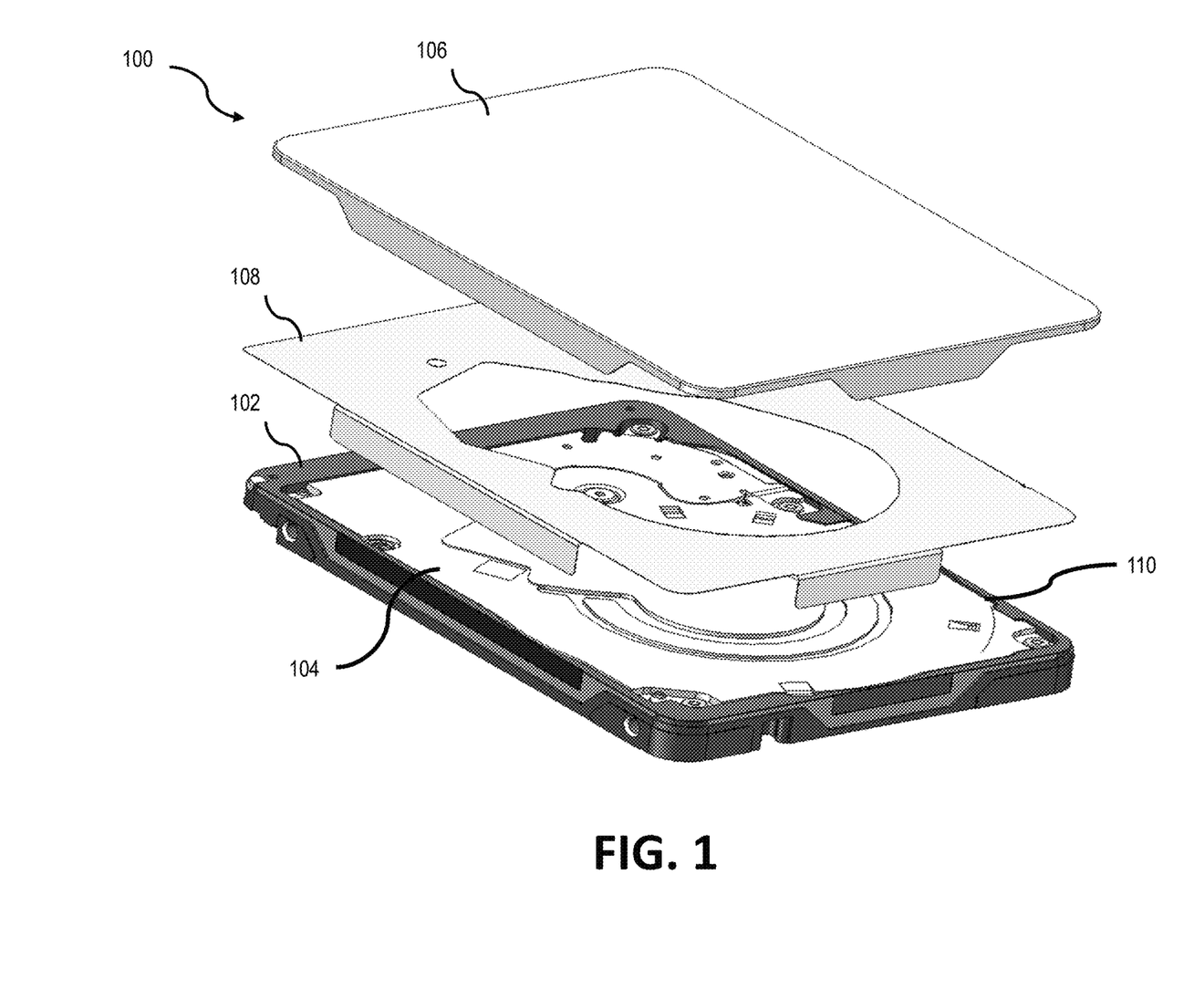
FIG. 1 shows a perspective exploded view of a hard disk drive, in accordance with certain embodiments of the present disclosure.

FIG. 1 shows an exploded view of a hard disk drive 100, which can include a base deck 102 (e.g., baseplate), a process cover 104, a top cover 106, and a seal 108. The process cover 104 and seal 108 can be coupled to the base deck 102 to create an internal cavity that houses data storage components like magnetic recording media, a spindle motor, an actuator, suspensions, and read/write heads, among other components.

During assembly, the process cover 104 can be coupled to the base deck 102 by removable fasteners and the seal 108 to seal a target gas (e.g., air with nitrogen and oxygen and/or a lower-density gas like helium) within the internal cavity. Once the process cover 104 and the seal 108 are coupled to the base deck 102, a target gas may be injected into the internal cavity through an aperture in the process cover 104, which is subsequently sealed (e.g., via an adhesive-backed seal). Injecting the target gas, such as a combination of air and a low-density gas like helium (e.g., with the target gas including 90 percent or greater helium), may involve first evacuating existing gas from the internal cavity and then injecting the target gas from a low-density gas supply reservoir into the internal cavity.

Once the process cover 104 is sealed, the hard disk drive 100 can be subjected to a variety of processes and tests. Example processes and tests include those that establish performance parameters of the hard disk drive 100 (e.g., fly-height parameters), that identify and map flaws on the magnetic recording media, that write servo and data patterns on the magnetic recording media, and that determine whether the hard disk drive 100 is suitable for commercial sale.

The seal 108 can be coupled to the base deck 102 and the process cover 104. For example, the seal 108 may include an adhesive backing, which is pressed against portions of the base deck 102 and the process cover 104. In certain embodiments, the seal 108 covers portions of an interface 110 between the base deck 102 and the process cover 104. For example, the seal 108 may cover some or all of where the base deck 102 and the process cover 104 contact each other along an outer periphery of the process cover 104 and inner periphery of the base deck 102. The seal 108 can help prevent or reduce gases leaking through the interface between the base deck 102 and the process cover 104. As shown in FIG. 1, the seal 108 can include a top portion and side wall portions or tabs that extend downward and cover sections of the base deck's sidewalls when the seal 108 is coupled to the base deck 102. The seal 108 has an inner opening such that sections of the process cover 104 are not covered by the seal 108 to allow those sections to be accessed after the seal 108 is adhered or otherwise coupled to the base deck 102 and the process cover 104.

In certain embodiments, the seal 108 is used instead of a gasket such that there is no gasket positioned between the base deck 102 and the process cover 104. As such, the base deck 102 and the process cover 104 can be directly coupled to each other along an outer area of the process cover without an intervening gasket.

In certain embodiments, the base deck 102 and the top cover 106 are coupled together by welding, which is discussed in more detail below. Because a small gap may exist between the top cover 106 and the process cover 104, coupling the base deck 102 and the top cover 106 together may create an internal cavity between the process cover 104 and the top cover 106. Once the top cover 106 is coupled to the base deck 102, a target gas may be injected through an aperture in the top cover 106 to fill the internal cavity between the process cover 104 and the top cover 106. The aperture can then be sealed by applying a seal, welding, or the like.

Figure 2:
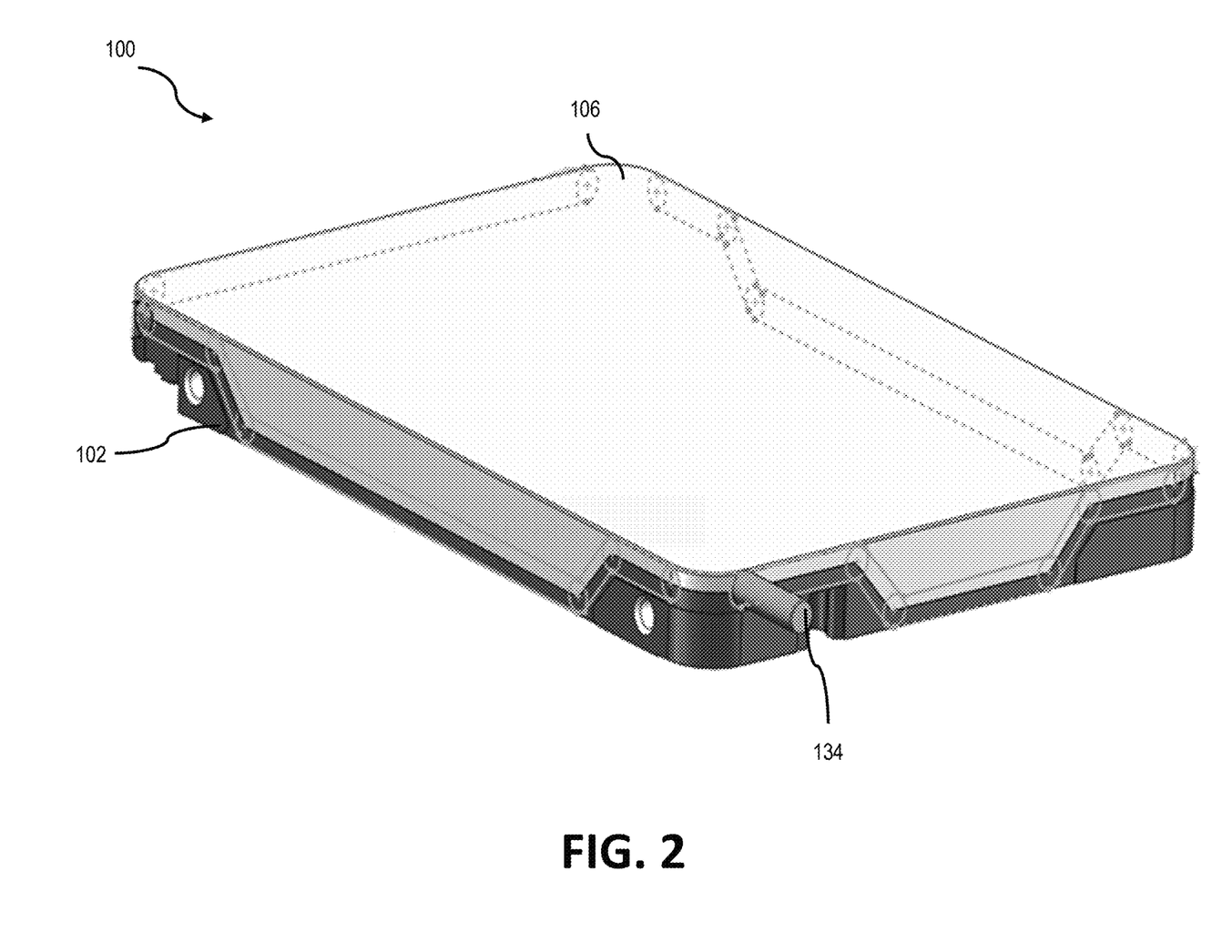
FIG. 2 shows a perspective view of the hard disk drive of FIG. 1 assembled, in accordance with certain embodiments of the present disclosure.

FIG. 2 shows the hard disk drive 100 in its assembled state. As shown in FIG. 2, the top cover 106 can be coupled to the base deck 102 such that the top cover 106 covers the process cover 104 as well as the seal 108.

Figure 3:
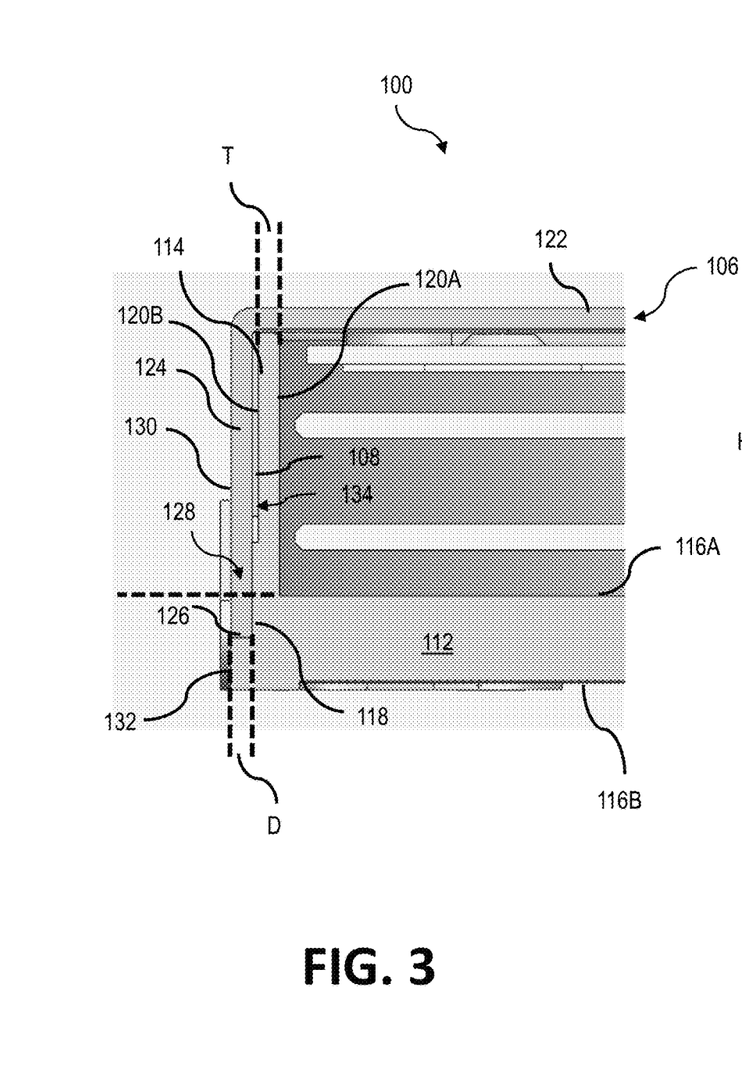
FIGS. 3 and 4 show cut-away views of portions of the hard disk drive of FIG. 1, in accordance with certain embodiments of the present disclosure.
Figure 4:
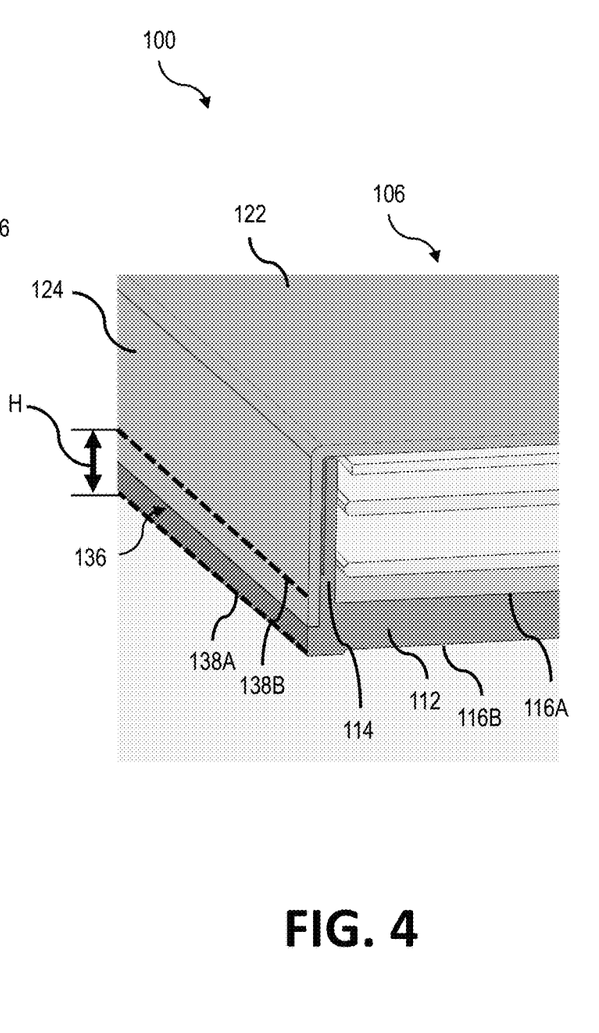

FIGS. 3 and 4 show different cut-away views of portions of the hard disk drive 100. As shown in FIG. 3, the base deck 102 includes a floor portion 112 and a side wall portion 114. The floor portion 112 of the base deck 102 extends between an upper surface 116A and a lower surface 116B. The side wall portion 114 extends up from the floor portion 112 (e.g., from the upper surface 116A) and above an outer periphery 118 of the floor portion 112 to form a continuous side wall for the base deck 102. The side wall portion 114 has a thickness (T) and extends between an inner wall surface 120A and an outer wall surface 120B. The thickness (T) can vary along the side wall portion 114, as will be described below in more detail.

As shown in FIG. 3, the top cover 106 includes a ceiling portion 122 and a wall portion 124. The wall portion 124 extends down from the ceiling portion 122 along an outer periphery of the top cover 106. In certain embodiments, the wall portion 124 can be characterized as extending in a direction that is perpendicular to a plane of the ceiling portion 122 and/or parallel to the side wall portion 114 of the base deck 102.

In certain embodiments and in certain areas of the assembled hard disk drive 100, the wall portion 124 extends such that it terminates at an elevation between the upper surface 116A and the bottom surface 1168 of the floor portion 112 of the base deck 102. A distal end 126 of the wall portion 124 can be positioned at an elevation between the upper surface 116A and the bottom surface 116B of the floor portion 112. As such, the distal end 126 of the wall portion 124 can be immediately adjacent to and directly contact the floor portion 112 of the base deck 102. In certain embodiments, sections of the wall portion 124 have a height (as measured from the ceiling portion 122 to the distal end 126) that is greater than a height of adjacent sections of the side wall portion 114 (as measured from the floor portion 112 to a distal end of the side wall portion 114).

The base deck 102 can include a first recess 128 having a depth (D). In certain embodiments, the depth (D) is the same or substantially the same as a thickness of the wall portion 124 of the top cover 106. As such, when the hard disk drive 100 is assembled, an outer surface 130 of the wall portion 124 can be flush with an outer surface 132 of the base deck 102. The base deck 102 can include a second recess 134 such that there is a gap between the wall portion 124 of the top cover 106 and the outer wall surface 1208 of the side wall portion 114 of the base deck 102. The gap can be used to accommodate the seal 108, which can be at least partially positioned in the gap between the wall portion 124 of the top cover 106 and the sidewall portion 114 of the base deck 102. For example, the adhesive backing of the seal 108 may be applied to the outer wall surface 120B of the side wall portion 114. The seal 108 can help reduce gas from leaking from the hard disk drive 100.

As noted above, the base deck 102 and the top cover 106 can be welded together. FIG. 4 shows an example weld path 136 with a height (H) extending between a lower boundary 138A and an upper boundary 138B and that extends partially along the wall portion 124 of the top cover 106 and the floor portion 112 of the base deck 102. In certain embodiments, the weld path 136 has a height (H) of 1-4 mm (e.g., 1.5 mm, 2 mm, 2.5 mm, 3 mm).

Figure 5:
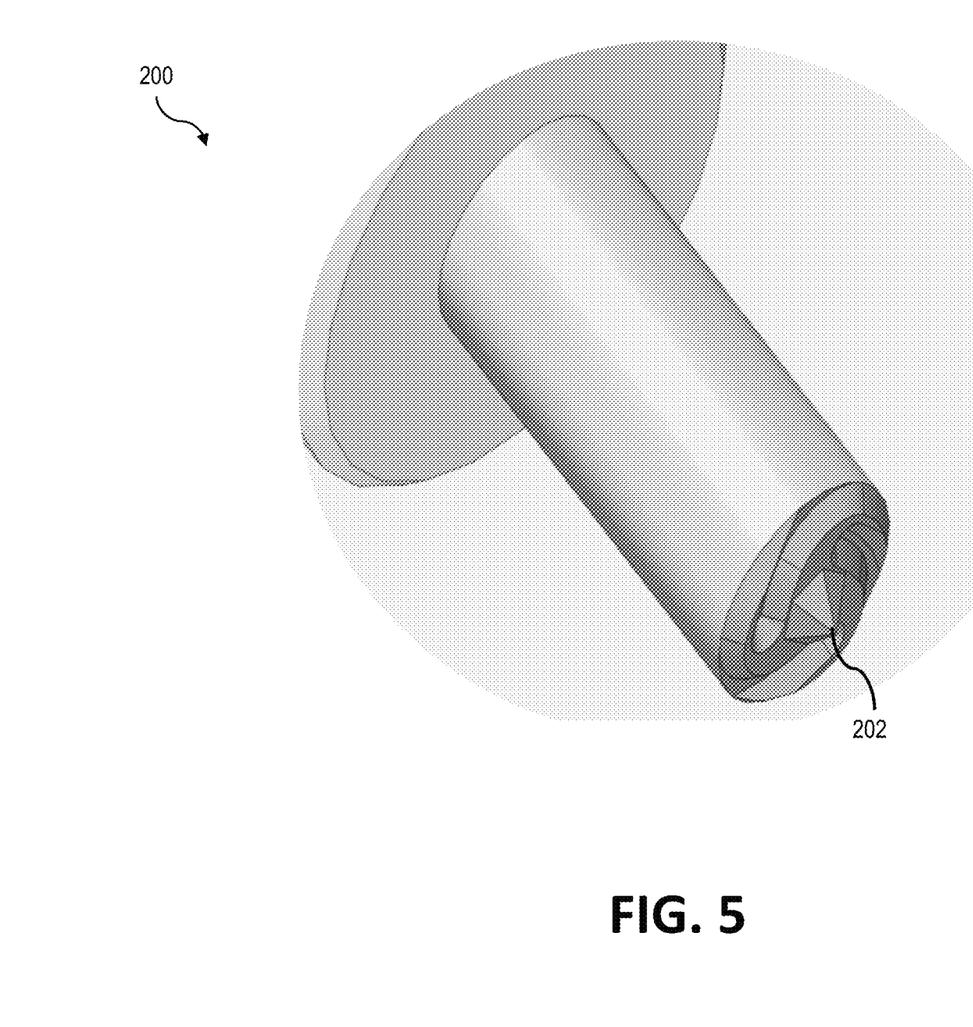
FIG. 5 shows a perspective view of a weld tip, in accordance with certain embodiments of the present disclosure.

The weld path 136 can be created by a weld tip 200, an example of which is shown in FIG. 5. The weld tip 200 can be considered to be a friction stir weld tip. To weld the top cover 106 to the base deck 102, the weld tip 200 is rotated and pressed against the hard disk drive 100 with a relatively large force. While the weld tip 200 is rotated and pressed against the hard disk drive 100, the weld tip 200 is moved or translated along the weld path 136. During this process, the weld tip 200 mechanically mixes together the material (e.g., metal) of the base deck 102 and the top cover 106. The weld tip 200 may heat (e.g., via friction) and soften metal of the base deck 102 and the top cover 106 without necessarily melting the metal. In certain embodiments, the metals of the base deck 102 and the top cover 106 are dissimilar. For example, the base deck 102 can comprise aluminum and the top cover 106 can comprise steel. The diameter of the weld top 200 dictates the height (H) of the weld path 136 when the weld tip is used for only a single pass. As such, the weld tip 200 can have a diameter of 1-4 mm (e.g., 1.5 mm, 2 mm, 2.5 mm, 3 mm).

Referring back to FIG. 4, the weld path 136 extends along a bottom portion of the hard disk drive 100. A portion of the height (H) of the weld path 136 extends partially along the base deck 102 and partially along the top cover 106. As such, a portion of the top cover 106 is welded to the base deck 102 between the upper surface 116A and the bottom surface 116B of the floor portion 112 of the base deck 102.

Because the floor portion 112 of the base deck 102 has more material (e.g., has a greater thickness) than the side wall portion 114, welding the top cover 106 to the floor portion 112 is less likely to deform the base deck 102 undesirably. For example, the thickness (T) of the side wall portion 114 for smaller hard disk drives (e.g., 2.5 inch form factor hard disk drives) can be between 0.4-0.6 mm compared to 3-4 mm for larger hard disk drives (e.g., 3.5 inch form factor hard disk drives). Side walls with smaller thicknesses cannot reliably withstand the force applied by the weld tip 200 when welding the top cover 106 to the side wall portion 114 of the base deck 102. However, because the top cover 106 is welded to the floor portion 112 of the base deck 102, it is less likely that the base deck 102 is deformed during the welding process. The hard disk drive 100 can be considered to include floor-welded sections.

Figure 6:
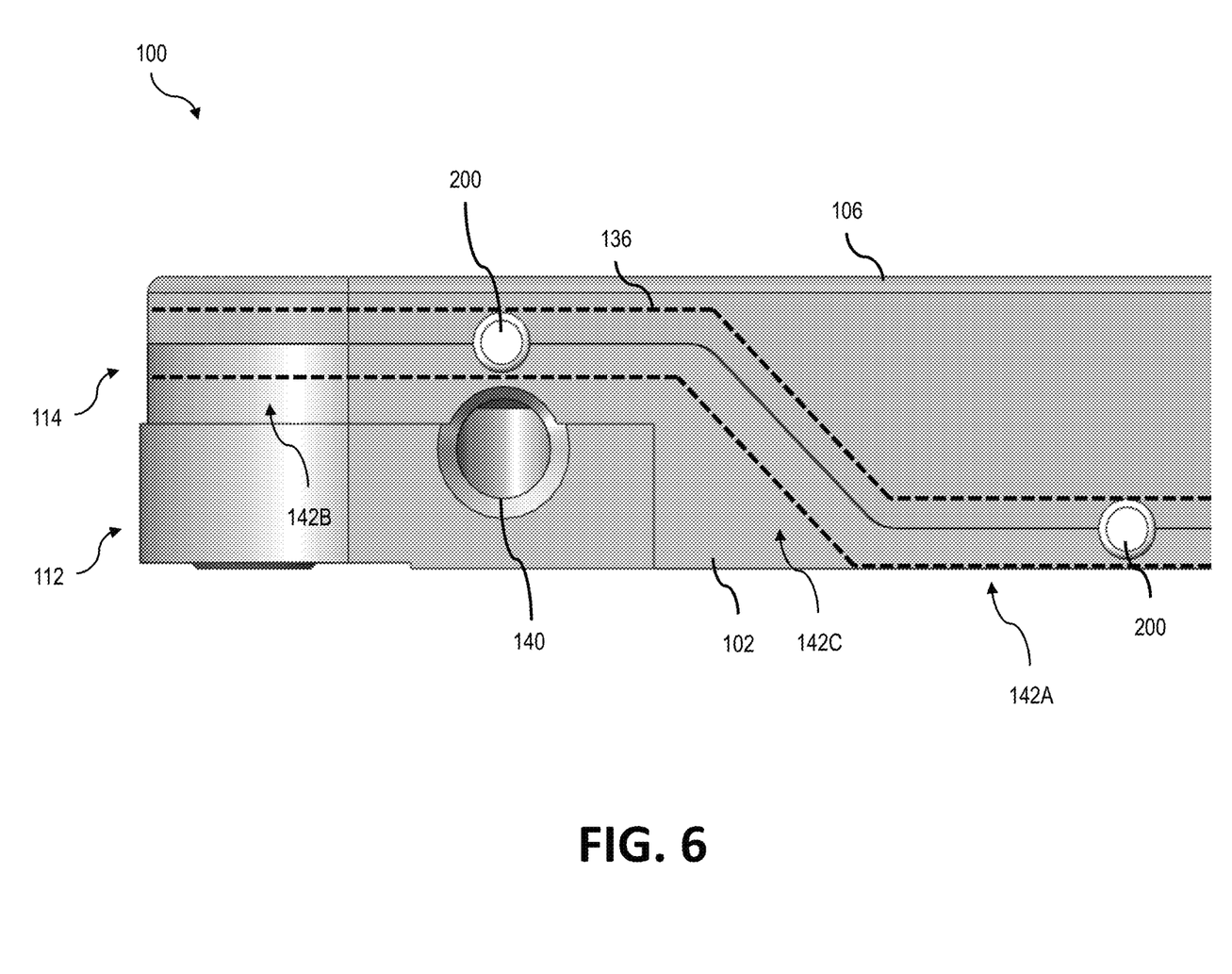
FIGS. 6 and 7 show side views of different portions of the hard disk drive of FIG. 1, in accordance with certain embodiments of the present disclosure.
Figure 7:
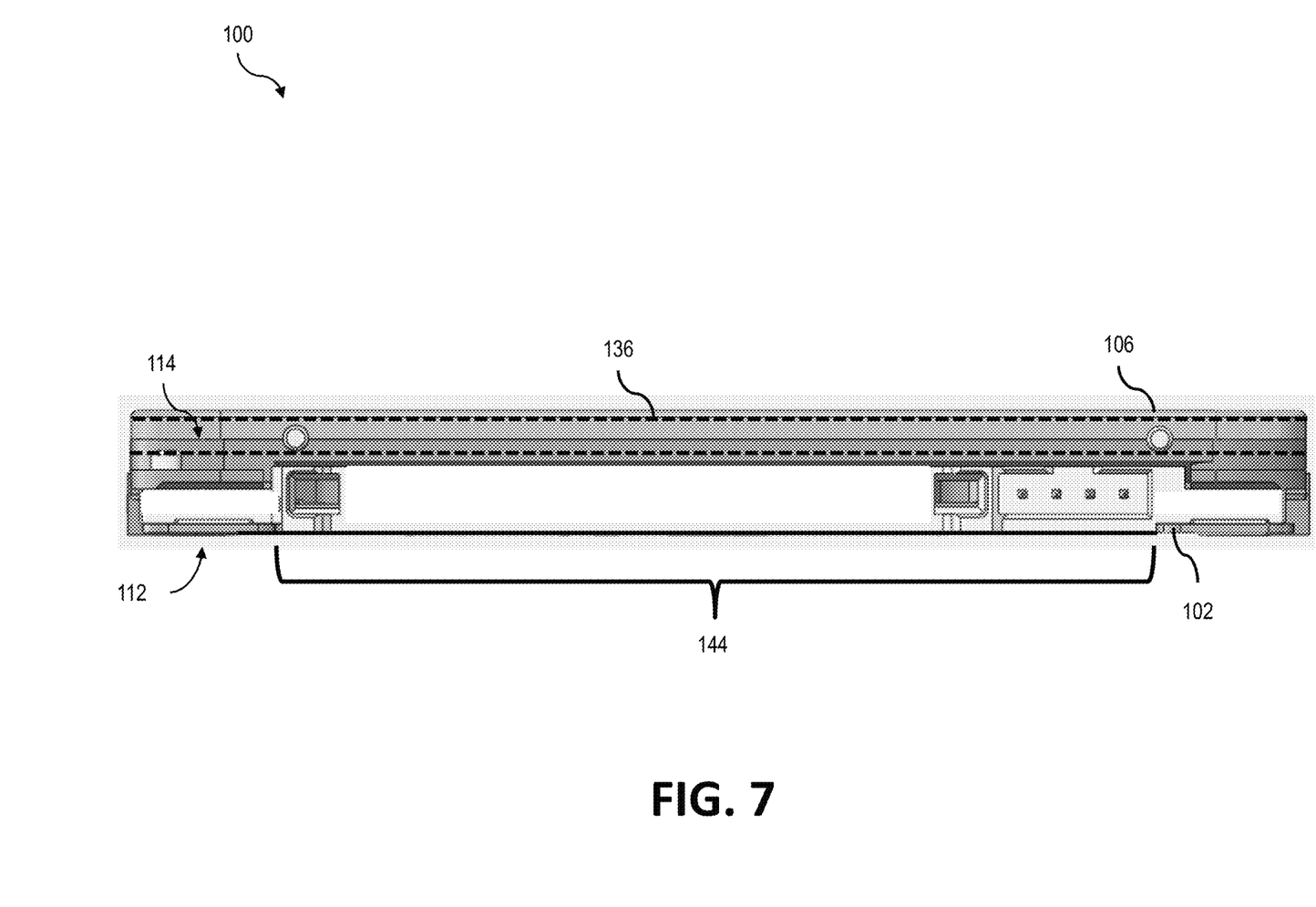
Figure 8:
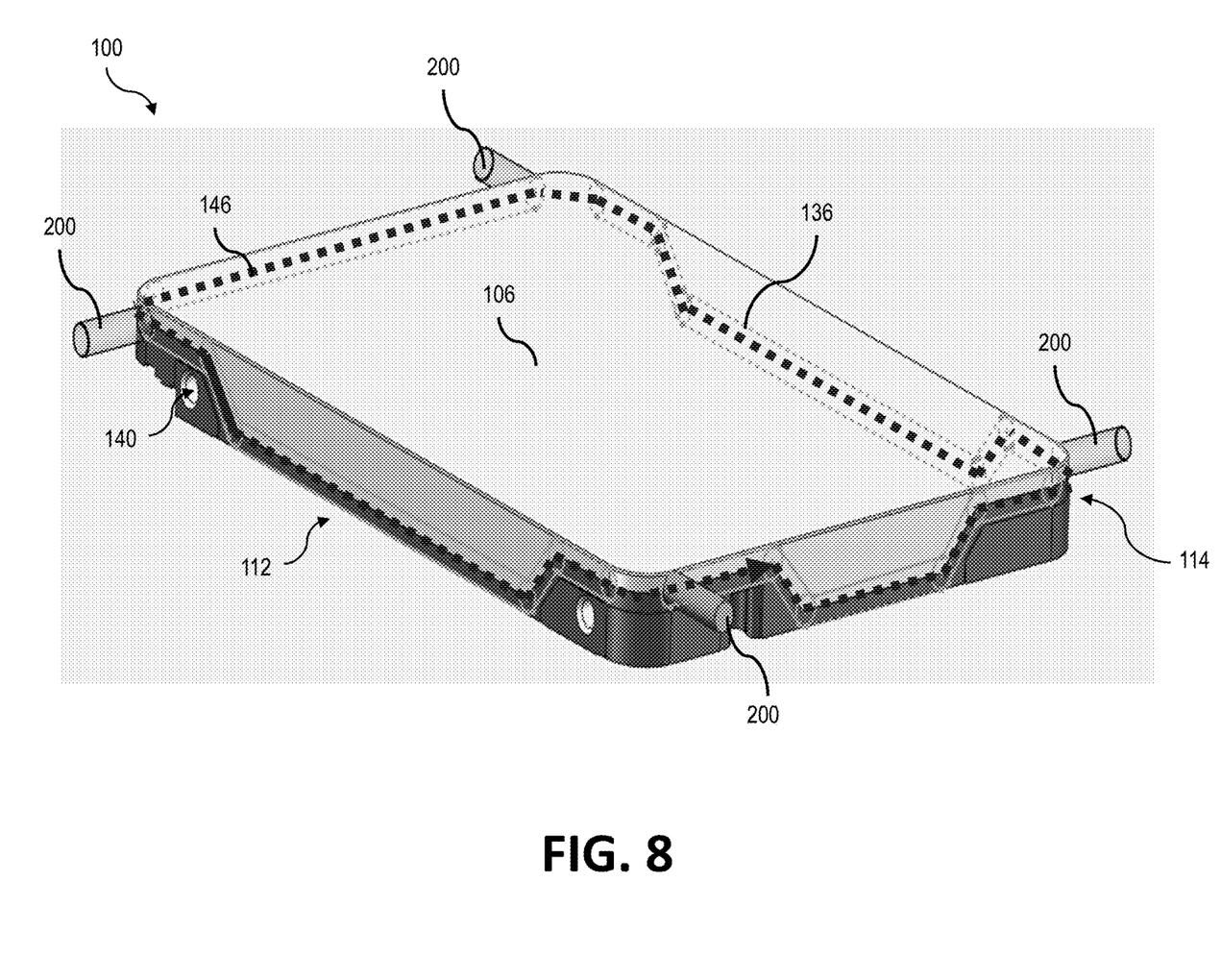
FIG. 8 shows a perspective view of the hard disk drive of FIG. 1 assembled along with an illustrative weld path, in accordance with certain embodiments of the present disclosure.

However, in certain embodiments, because of the geometry of the hard disk drive 100, some sections of the weld path 136 include wall-welded sections. FIGS. 6-8 show the weld path 136 extending along sections of the hard disk drive 100 such that the top cover 106 is welded to the side wall portion 114 of the base deck 102. For example, in FIG. 6, the base deck 102 is shown with a mounting hole 140, which can be a threaded blind hole that extends into the side wall portion 114. The mounting hole 140 can be used to fasten the hard disk drive 100 to another structure such as a casing or server drawer.

If the weld path 136 extended along the floor portion 112 of the base deck 102 around the entire periphery of the base deck 102, the weld tip 200 may overlap with the mounting hole 140 and interfere with the mounting hole 140. As such, as shown in FIG. 6, the weld path 136 can have a floor-welded portion 142A, a wall-welded portion 142B, and a transition portion 142C positioned between the floor-welded portion 142A and the wall-welded portion 142B where the weld tip 200 follows a straight diagonal path, at least in certain embodiments.

The part of the side wall portion 114 where the mounting hole 140 is located (and along the transition portion 142C) has a thickness that is greater than other parts of the side wall portion 114, for example, parts immediately adjacent to where the magnetic recording media are positioned. As such, the part of the side wall portion 114 where the mounting hole 140 is located is less likely to deform under the force of the weld tip 200. Along the wall-welded portion 142B, the top cover 106 has a shorter wall portion 124 than the floor-welded portion 142A, although the wall portion 124 of the top cover 106 still at least partially overlaps with the side wall portion 114 such that the weld tip 200 has enough material to weld together. In certain embodiments, a height of the side wall portion 114 of the base deck 102 above the mounting hole 140 is approximately 1-1.5 mm and a height of the wall portion 124 of the top cover 106 above the mounting hole 140 is approximately 1-1.5 mm. In embodiments where the hard disk drive 100 has multiple mounting holes 140, the height of the wall portion 124 is greater between the mounting holes 140 than the height of the wall portion 124 above the mounting holes 140. In certain embodiments, the hard disk drive 100 has an overall height of 5-8 mm.

FIG. 7 shows another portion of the hard disk drive 100 where the top cover 106 is welded to the base deck 102 along the side wall portion 114 of the base deck 102 as opposed to the floor portion 112. The portion of the hard disk drive 100 shown in FIG. 7 is one of the two shorter sides of the hard disk drive 100. Along this side, the hard disk drive 100 includes an electrical connector 144 (e.g., SATA connector, SAS connector, and the like). The electrical connector 144 may consume up to 4-5 mm of height along the side of the hard disk drive 100, leaving 2-3 mm (e.g., 2.5 mm) of height for the base deck 102 and the top cover 106 above the electrical connector 144 in a 7 mm tall hard disk drive 100. Put another way, the total combined height of the side wall portion 114 of the base deck 102 and the wall portion 124 of the top cover 106 above the electrical connector 144 is 2-3 mm. In certain embodiments, the height of the side wall portion 114 of the base deck 102 is 1-1.5 mm, and the height of the wall portion 124 of the top cover 106 is 1-1.5 mm. For hard disk drives with such height constraints, the weld tip 200 used to weld the top cover 106 to the base deck 102 may have a diameter of 1-2 mm (e.g., 1.5 mm).

The part of the side wall portion 114 above the electrical connector 144 has a thickness that is greater than other parts of the side wall portion 114, for example, parts immediately adjacent to where the magnetic recording media are positioned. As such, the part of the side wall portion 114 above the electrical connector 144 is less likely to deform under the force of the weld tip 200.

FIG. 8 shows an example of the weld path 136 for welding the top cover 106 to the base deck 102. The hard disk drive 100 is shown partially transparent so that the entire weld path 136 around the hard disk drive 100 can be seen. The thicker dotted line 146 represents a center line of the weld path 136 along where a center tip 202 (shown in FIG. 5) of the weld tip 200 follows.

As shown in FIG. 8, on three sides of the hard disk drive 100, portions of the top cover 106 are welded to the floor portion 112 of the base deck 102 and other portions of the top cover 106 are welded to the side wall portion 114 of the base deck 102. For example, on the two longer sides of the hard disk drive 100, the base deck 102 includes two mounting holes 140 and the weld path 136 passes above the mounting holes 140 along the side wall portion 114. Between the mounting holes 140, the weld path 136 extends along a bottom side of the hard disk drive 100 where the floor portion 112 of the base deck 102 is located.

Similarly, on one of the shorter sides of the hard disk drive 100, the weld path 136 extends along the floor portion 112 of the base deck 102. As such, the wall portion 124 of the top cover 106 shown in FIG. 8 has three sections where the height of the wall portion 124 is greater than other sections of the top cover 106. These taller sections coincide with sections of the base deck 102 where the side wall portion 114 is the thinnest. In certain embodiments, the side wall portion 114 is thinnest at locations that are adjacent to where magnetic recording media would be positioned so that the diameter of the media can be larger. The second of the shorter sides of the hard disk drive 100 is where the electrical connector 144 is positioned. As described above, the weld path 136 along that side of the hard disk drive 100 extends along a top side of the hard disk drive 100 where the side wall portion 114 of the base deck 102 is located.

Although equally useful in larger form factor hard disk drives, incorporating the above-described allows for smaller form factor hard disk drives (e.g., 2.5" form factor hard disk drives) with thinner profiles (e.g., 7 mm) to be sealed by welding (among other sealing features such as the seal 108). As such, smaller and thinner hard disk drives can be filled with helium and sealed by welding to help maintain the internal helium-filled environment.

Figure 9:
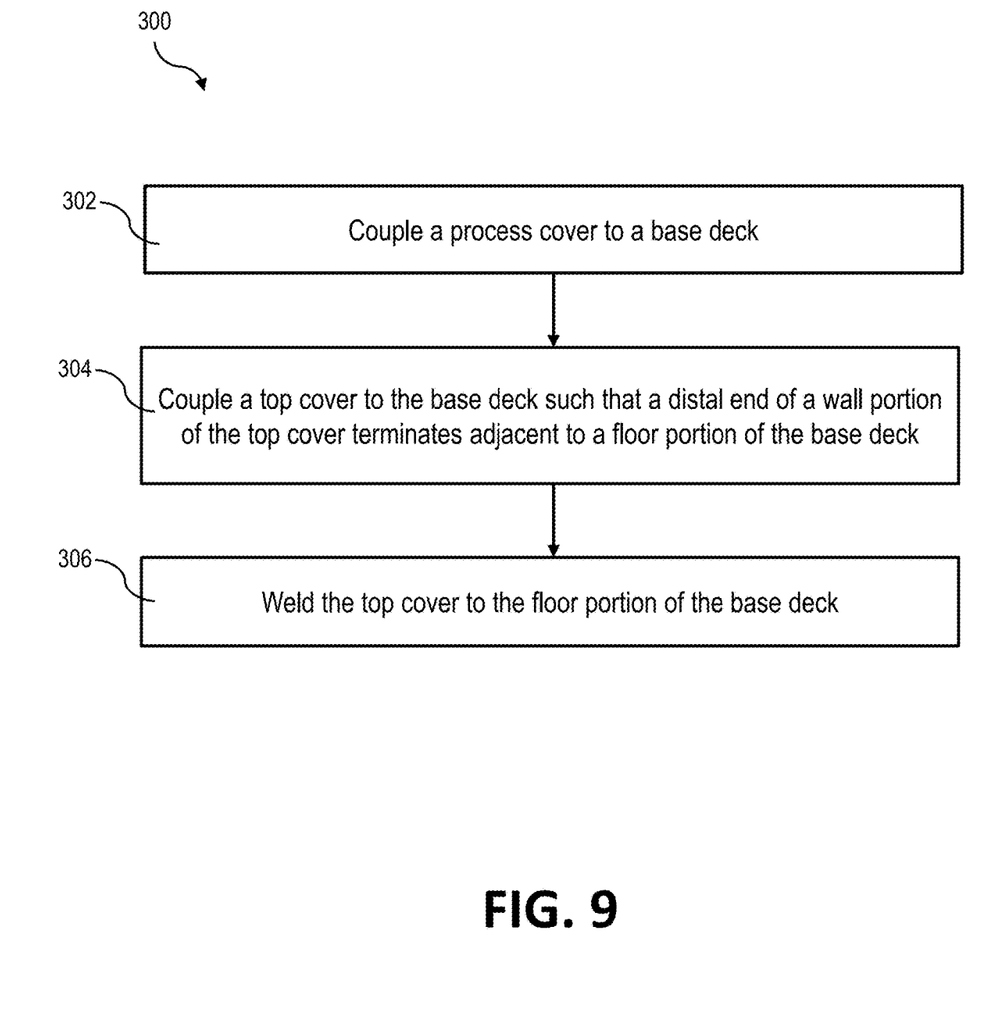
FIG. 9 shows a block diagram representation of a method for making a hard disk drive, in accordance with certain embodiments of the present disclosure.

FIG. 9 shows an illustrative method 300 for assembling the base deck 102 to the top cover 106. The method 300 includes coupling the process cover 104 to the base deck 102 (block 302 in FIG. 9). The method 300 further includes coupling the top cover 106 to the base deck 102 such that the distal end 126 of the wall portion 114 of the top cover 106 terminates adjacent to the floor portion 112 of the base deck 102 (block 304 in FIG. 9). The method 300 further includes welding the top cover 106 to the floor portion 112 of the base deck 102 (block 306 in FIG. 9).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disk drive comprising:
 a base deck including a floor portion and a side wall portion, the floor portion extending between an upper surface and a bottom surface, the side wall portion extending from the floor portion in a direction perpendicular to the upper surface;

a process cover coupled to the base deck; and a top cover coupled to the base deck and including a ceiling portion and a wall portion, the wall portion extending from the ceiling portion and terminating between the upper surface and the bottom surface of the floor portion of the base deck.

2. The hard disk drive of claim 1, further comprising:

a seal at least partially covering an interface between the base deck and the top cover and positioned between the top cover and the base deck.

3. The hard disk drive of claim 2, wherein the seal is positioned between the side wall portion of the base deck and the wall portion of the top cover.

4. The hard disk drive of claim 1, wherein the wall portion of the top cover extends perpendicular to the ceiling portion of the top cover.

5. The hard disk drive of claim 1, wherein the top cover is directly coupled to the floor portion of the base deck.

6. The hard disk drive of claim 1, wherein a portion of the top cover is welded to the base deck between the upper surface and the bottom surface of the floor portion of the base deck.

7. The hard disk drive of claim 6, the welded portion has a height of 2-4 mm.

8. The hard disk drive of claim 1, wherein a first material of the top cover is mixed with a second material of the base deck.

9. The hard disk drive of claim 1, wherein a thickness of the side wall portion is 0.4-0.6 mm.

10. The hard disk drive of claim 1, wherein a height of the wall portion is greater than a height of an adjacent section of the side wall portion.

11. The hard disk drive of claim 1, wherein the base deck includes a first recess for accommodating the wall portion and a second recess for accommodating a seal.

12. The hard disk drive of claim 1, wherein the hard disk drive has a height of 5-8 mm.

13. The hard disk drive of claim 12, wherein the hard disk drive has a 2.5 inch form factor.

14. The hard disk drive of claim 1, further comprising an electrical connector, wherein a total height of the side wall portion and the wall portion above the electrical connector is 2-3 mm.

15. The hard disk drive of claim 1, further comprising a mounting hole formed in the side wall portion, wherein a height of the side wall portion above the mounting hole is 1-1.5 mm, wherein a height of the wall portion above the mounting hole is 1-1.5 mm.

16. The hard disk drive of claim 1, wherein a first height of the wall portion is greater between mounting holes than a second height of the wall portion above the mounting holes.

17. The hard disk drive of claim 1, wherein a first outer surface of the wall portion is flush with a second outer surface of the floor portion of the base deck.

18. A hard disk drive comprising:

a base deck including a floor portion and a side wall portion, the floor portion extending between an upper surface and a bottom surface, the side wall portion extending from the floor portion in a direction perpendicular to the upper surface;

a top cover coupled to the base deck and including a ceiling portion and a wall portion; and a weld that directly couples the wall portion of the top cover to the floor portion of the base deck.

19. The hard disk drive of claim 18, wherein the weld has a weld path that extends along an outer periphery of the hard disk drive adjacent the floor portion at sections and adjacent the side wall portion at other sections.

20. The hard disk drive of claim 18, wherein a first outer surface of the wall portion is flush with a second outer surface of the floor portion of the base deck.

* * * * *